UNITED STATES PATENT OFFICE.

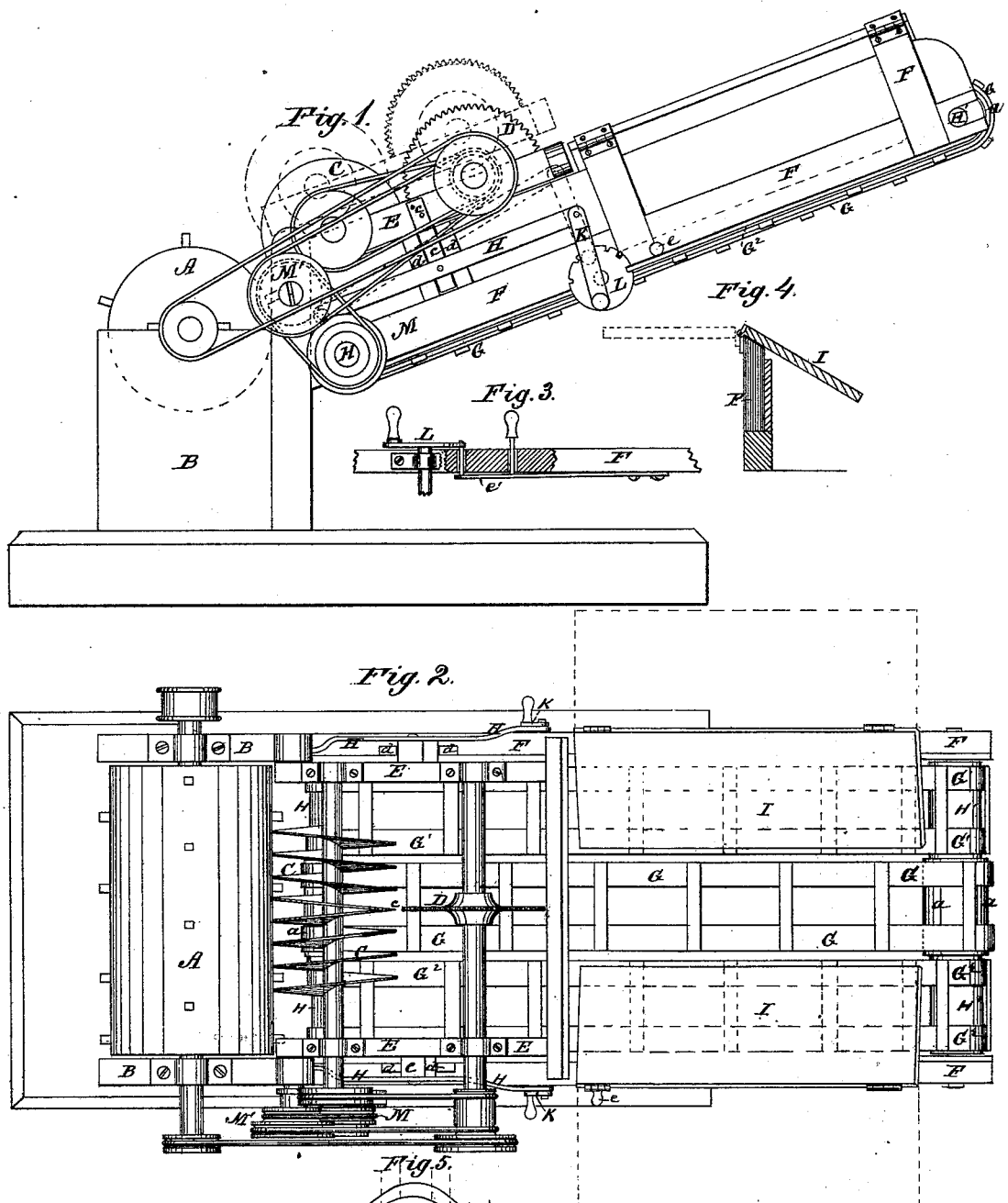

ORLANDO CLEAVELAND, OF MIDDLESEX, NEW YORK.

IMPROVEMENT IN GRAIN-FEEDER AND BAND-CUTTER FOR THRASHING-MACHINES.

Specification forming part of Letters Patent No. 215,098, dated May 6, 1879; application filed November 11, 1878.

*To all whom it may concern:*

Be it known that I, ORLANDO CLEAVELAND, of Middlesex, in the county of Yates and State of New York, have invented a new and Improved Grain-Feeder and Band-Cutter for Thrashing-Machines; and I do hereby declare that the following is a full, clear, and exact description of the same.

My invention is an improvement in the class of machines for feeding grain to thrashers in which a rotating cutter is employed to cut the bands of the gavels as the latter are carried forward by traveling belts, and in which a screw is employed for the purpose of spreading the grain after the bands have been cut.

My improvements consist, first, in the combination of a screw, a band-cutter, and three conveying-belts, the middle one of which latter is made to travel faster than the others, the convolutions or spiral flanges of the screw extending over the two side belts; second, in mounting said screw and the serrated-edged band-cutter in a vertically-adjustable frame, for the purpose of enabling them to be raised and lowered, according as the grain being fed to the machine is bound in large or smaller gavels; third, in the employment of a series of endless carrying-belts, of which the middle one passes around larger pulleys, and thereby is made to travel faster than its neighbors, for the purpose of making the feed or supply of grain to the thrashing-cylinder continuous, or less intermittent in character than in other machines of this class; fourth, in hinging the inclines which guide the gavels onto the traveling-belts, so that said inclines may be turned back out of the way and serve as tables when loose grain is being thrashed.

In the accompanying drawings, Figure 1 is a side elevation of my improved machine. Fig. 2 is a plan view of the same. Figs. 3 and 4 are detail views. Fig. 5 illustrates the manner of feeding the grain.

The thrashing-cylinder A is mounted in a fixed frame, B, while the parallel double screw C and shaft of band-cutter D have their bearings in a frame, E, which is adjustable upwardly on the inclined rigid extension F of frame B. The bottom of the extension F is formed of three belts, G $G^1$ $G^2$, of which the middle one, G, is made to travel faster than the others, $G^1$ $G^2$, by reason of its passing around enlarged portions $a$ $a$ of the shafts H H', which have their bearings in the upper and lower ends of frame F.

The sheaves or gavels are placed on the upper end of the frame F, and guided onto the middle belt, G, by the inclines I I. The said belt carries them down beneath the serrated-edged cutter D, which severs the band and allows the grain to be spread laterally, or both to right and left, by the double screw C. The latter is constructed of right and left spirals or flanges, whose inner ends meet and form a point, $c$, which enters and divides the grain immediately when it has passed under the band-cutter D. The ultimate effect of the action of the screw is to spread the grain uniformly or to a uniform depth, so that the thrasher will be enabled to act on it in the best manner and thrash out the grain. The middle belt, G, is made to travel fastest, in order that, as a gavel leaves the band-cutter D and is spread laterally by screw C, the portion resting on said belt shall be fed to the cylinder in advance of the remainder, which rests on belts $G^1$ $G^2$, so that no intermission shall occur in the feed, such as would be inevitable if the whole gavel should begin to feed at once. In other words, there is, so to speak, a lap of the central portion of each gavel with the outer portions of the one preceding it, so that said middle portion reaches the cylinder A, and also leaves it, simultaneously with the rear ends of the outer portions of the gavel in front of it. This is illustrated by the diagram of curved parallel lines in Fig. 5.

The frame E is made vertically adjustable to vary the height of the screw C and band-cutter D above the traveling belts, as required by the size of the gavels being fed to the cylinder. For instance, if the gavels be thick, (as they usually are when the grain is tall and thick set on the ground,) the parts C D require to be adjusted higher than when the gavels are thinner. Said frame E has short vertical bars $c$ attached to its sides, which are fitted between parallel guide-pieces $d$ $d$, attached to the sides of frame F. Thus, as the frame E is raised, the bars $c$ hold it at the same general inclination to the frame F.

To elevate the frame E, I employ levers H

H of the second order, which are pivoted to pieces c and frame F, one on each side of the latter. The upper or free ends of the levers are connected by rods K to notched disks L, fixed on the ends of a cross-shaft. Said disks are rotated to raise or lower the frame E and its attachments, and a spring-catch, e, Fig. 3, serves to lock the disks, so that the frame is held fixed in any adjustment.

The inclines I are hinged to the sides of frame F, in order to adapt them to be turned back out of the way, as shown in dotted lines in Figs. 2 and 4, when it is desired to feed loose instead of bound grain, it being then necessary to have all three belts, $G G^1 G^2$, engaged in carrying the grain forward to the cylinder. When thrown back, the inclines also serve as tables, on which to deposit the grain. They will in such case be supported by braces. (Not shown.)

The rotating and traveling parts of the machine are driven from the shaft of the cylinder A by suitable belt-connection, as shown in Figs. 1 and 2. In order to vary the travel of the belts $G G^1 G^2$ as required by the condition of the grain, I employ grooved differential pulleys M M', one of which, M, is keyed on the shaft H.

What I claim is—

1. In a grain-feeding attachment for thrashing-machines, the combination of the three belts $G G^1 G^2$, of which the middle one is made to travel faster than the others, the band-cutter arranged over said middle belt, and the screw having right and left threads $b$ $b$, with one or more convolutions over each of the respective side belts $G^1 G^2$, whereby the grain is spread over the latter and the middle portion of the stratum of grain fed faster than the other portions, as specified.

2. In a grain-feeding attachment for thrashing-machines, the combination, with the frame F, of an adjustable frame, E, having the band-cutter and grain-spreading device mounted therein, and the bars c and vertical parallel guides $d d$, the levers H, rods K, the notched disks L, and a stop or catch for the latter, all as shown and described, for the purpose specified.

3. In a grain-feeding attachment for thrashing-machines, the combination, with the cylinder, of the three belts $G G^1 G^2$ and the shafts H H, having central enlargements $a$, around which the middle belt passes, for the purpose of causing the latter to travel faster than the others, in order to produce a faster feed of the central portion of the grain carried by the belts, as specified.

4. In a grain-feeding attachment for thrashing-machines, the combination, with the frame F and traveling belts, of the inclines I, hinged as shown and described, to adapt them to be thrown back out of the way, for the purpose specified.

The above specification of my invention signed by me this 1st day of November, 1878.

ORLANDO CLEAVELAND.

Witnesses:
AMOS W. HART,
C. R. WRIGHT.